United States Patent [19]

Tice

[11] 4,081,639
[45] Mar. 28, 1978

[54] LIQUID-LEVEL FLOAT SWITCH CONSTRUCTION

[75] Inventor: Charles Tice, Plantsville, Conn.

[73] Assignee: DeLaval Turbine Inc., Princeton, N.J.

[21] Appl. No.: 760,573

[22] Filed: Jan. 19, 1977

[51] Int. Cl.² ............................................. H01H 35/18
[52] U.S. Cl. .............................. 200/84 C; 340/244 A; 73/313; 73/308
[58] Field of Search ................ 200/61.2, 302, 84 R, 200/84 C; 73/308, 313, DIG. 5, 319, 322.5; 340/244 A

[56] References Cited

U.S. PATENT DOCUMENTS

| 3,555,905 | 1/1971 | George | 73/322.5 |
| 3,751,614 | 8/1973 | Jones | 200/84 C |
| 3,857,004 | 12/1974 | Kavthekar | 340/244 A |
| 4,020,481 | 4/1977 | Nakagawa | 340/244 A |

*Primary Examiner*—Gerald P. Tolin
*Attorney, Agent, or Firm*—Hopgood, Calimafde, Kalil, Blaustein & Lieberman

[57] ABSTRACT

The invention contemplates an improved electric switch which changes its state via float response to achievement of a particular liquid level. The construction features mechanical seal and shield structure whereby liquid is kept out of the region of float guidance, with the result that float response is substantially isolated from sloshing action and from liquid contamination.

8 Claims, 1 Drawing Figure

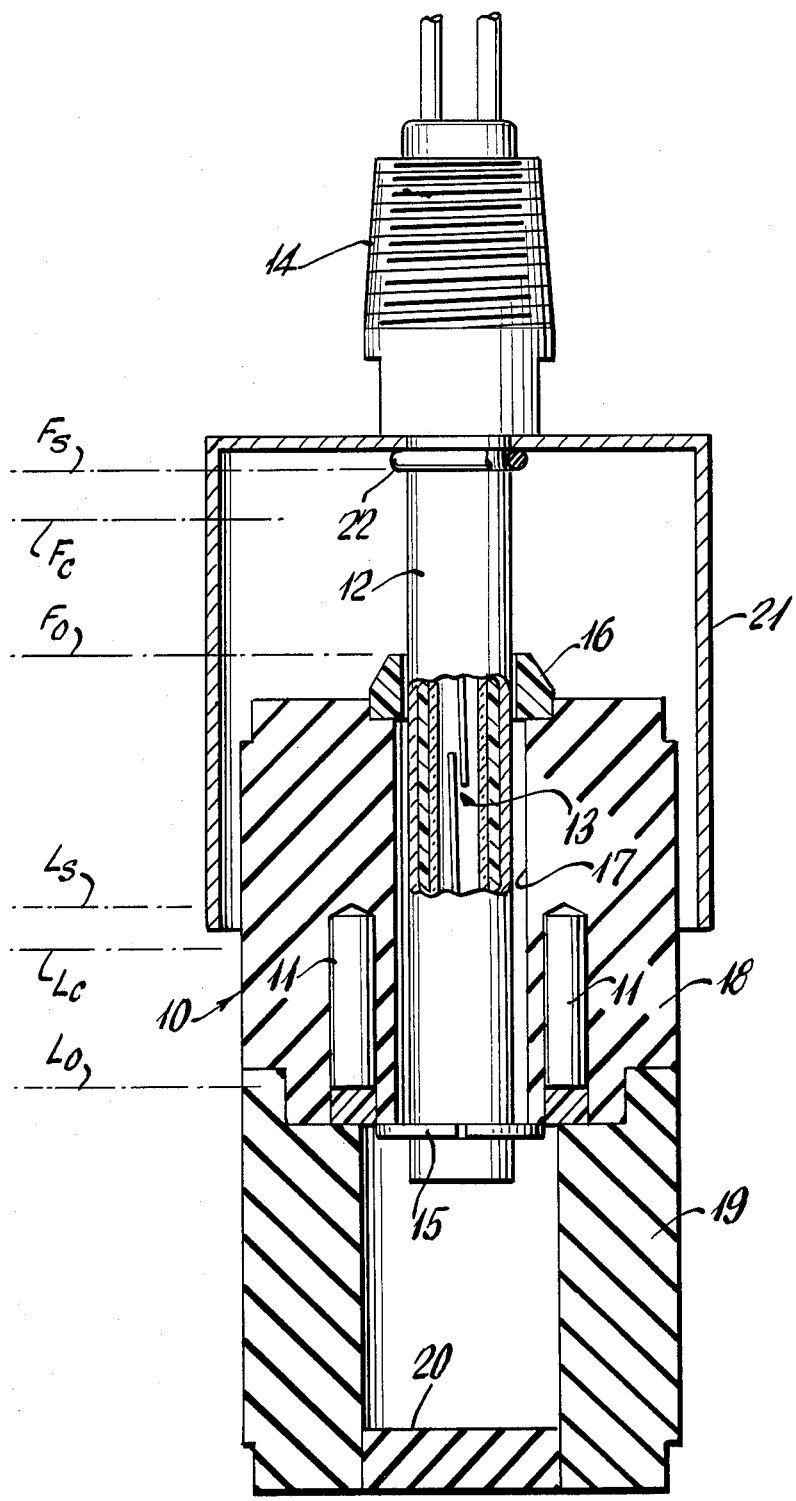

LIQUID-LEVEL FLOAT SWITCH CONSTRUCTION

The invention relates to float-operated electric switches and in particular to those of the magnetic-reed variety, wherein relative motion of a float member with respect to a fixed-support member is relied upon to develop a change of state of the switch member, upon achievement of a predetermined liquid level.

In certain liquid-level sensing environments, as for example to remotely indicate tank level in an oil-tanker vessel, the fixed vertical stem relied upon for float guidance may be constantly exposed to a corrosive and sludge-depositing environment, causing impairment of indicating functions and relatively short life.

It is, accordingly, an object of the invention to provide an improved float switch of the character indicated.

Another object is to provide such a switch with means to prevent liquid contamination of mechanically moving parts.

A further object is to provide such a switch with a greater measure of inherent isolation of float action from sloshing at the liquid surface.

A general object is to achieve the foregoing with relatively simple and foolproof mechanism, and characterized by long life and reliability, even in the presence of unrefined or corrosive liquids.

Other objects and various features of novelty and invention will be pointed out or will occur to those skilled in the art from a reading of the following specification in conjunction with the accompanying drawing which shows, in longitudinal section and for illustrative purposes only, a preferred form of the invention.

In the drawing, the invention is shown in application to a float switch wherein a tubular float 10 carries permanent-magnet elements 11 with rise and fall of the level of a liquid in which float 10 is buoyant. Float 10 is guided on a fixed vertical tubular stem 12 of non-magnetic material such as brass and containing a magnetic-reed switch 13 which is caused to change its open vs. closed state in accordance with instantaneous positioning of magnetic elements 11 in proximity to a predetermined liquid level; contacts of switch 13 are hermetically sealed within an elongate glass envelope, and the latter is suitably epoxy or otherwise potted in its mounting within stem 12. The stem 12 is fixedly mounted by clamped bracket or other connection (not shown) to the threaded upper end 14 of the stem, and electrical leads to switch 13 pass through the upper end 14 for external circuit connection as desired.

More specifically, the stem 12 includes stop means 15 in the form of a clamp, grip ring or flange against which part of float 10 can rest for its bottom position, and a guide bushing 16 carried at the upper end of float 10 has close-clearance nose-piloting guided engagement with the stem 12; bushing 16 may be of injection-molded plastic, such as nylon or polypropylene. Preferably, the stem clearance with the bore of bushing 16 is less than the bore 17 of float 10.

Float 10 is shown to comprise three fitted parts: an upper annular member 18 having oppositely offset parallel bores in which magnetic elements 11 are received and potted, as with an epoxy; a lower annular member 19 suitably counter-bored for concentric end fit to member 18; and a base plug 20 fitted to the bore of member 19. The float parts 18-19-20 may be of "Buna-N" synthetic rubber, and bonded to each other and to bushing 16, to define an upwardly open cup which is open only at the clearance of bushing 16 to stem 12. In the drawing, the designation $L_o$ signifies the liquid level, i.e., top-surface level of liquid, at which float begins to lift from its seated or bottom position shown. Rising liquid level raises magnetic elements 11 into state-changing coaction with switch 13, at a predetermined liquid level $L_c$ short of float interference with the upper end of the guide portion of stem 12.

In accordance with a feature of the invention, the closed end of an inverted cup-shaped member 21 is affixed to the upper end of stem 12 so that the skirt of cup 21 radially clears and axially overlaps at least the upper end of float 10, for all possible float elevations. Thus, with rising liquid level, float 10 displaces further into the inner volume of the cupped member 21. Also in accordance with the invention, an elastomeric bushing such as a Neoprene O-ring 22 is seated on stem 12 and against the adjacent inner wall of cupped member 21, for circumferentially continuous sealing contact with the upwardly projecting end of float bushing 16, at an upper float position $L_s$, said upper float position being above the state-changing level $L_c$. For convenience, the upper limit of float 10 is shown, by designations $F_o$-$F_c$-$F_s$, for its positions with respect to seal member 22, corresponding to the liquid levels designated $L_o$-$L_c$-$L_s$, respectively.

In operation, the described float switch is fixedly mounted at 14 such that the level $L_c$ will be the predetermined switch-operating top level for liquid in the tank to be monitored. Until rising liquid reaches the level $L_o$, float 10 will remain seated upon the stop means 15. Beyond level $L_o$, float 10 will be buoyed upwardly, and at level $L_c$, magnet elements 11 will have actuated switch 13 to change its state, e.g., for the normally open condition shown, contact closure will occur at liquid level $L_c$. Any further rise in liquid level, as when a tanker develops a list or roll, will drive float 10 into sealed relation with the elastomeric ring 22, thus positively closing the stem 12 from liquid exposure.

Quite aside from the described seal action at 16-22, it will be appreciated that the skirt of cupped member 21 begins to trap air and thus to preclude liquid entry, at levels near and above $L_c$, thus avoiding slosh of liquid within member 21 even though a sloshing wave may transiently immerse member 21 to create the appearance of a "liquid level" near or above $L_s$. Thus, the skirt of member 21 provides added assurance against liquid entry into the region of stem guidance of float 10.

The described device will be seen to have achieved all stated objects with basic simplicity and reliability. For liquids such as crude oil, containing foreign particles or inherently sludge-forming, the invention permits prolonged operation in an inherently contamination-free environment, such that mechanical sliding action can remain unimpaired. Stated in other words, the stem 12 can remain free from corrosion or sludge accumulation which might otherwise occur but for the seal (22) and shield (21) action of the disclosed structure. Of course, as liquid level recedes, upon withdrawal from the tank, float 10 drops below level $F_c$, thus allowing switch 13 to return to its initial state, and float 10 will hold at stop 15 as long as the liquid level has dropped below $L_o$.

While the invention has been described in detail for the preferred form shown, it will be understood that modifications may be made without departure from the scope of the invention. For example, the switch at 13 may be of normally open or normally closed variety, depending on application requirements. Also, peripheral grooves in stem 12 may receive and axially locate the stop ring 15 and the O-ring 22, rather than relying upon frictional engagement alone for the axial positioning of these elements.

What is claimed is:

1. A liquid level float-switch construction, comprising a hollow upstanding elongate guide stem of non-magnetic flux-conducting material, said stem being closed at its lower end and containing a magnetic-reed switch with electrical lead connections thereto via the upper end of said stem, means at said upper end for fixedly mounting said stem, float means closed at its lower end and having a central bore for guided reception of said stem, permanent-magnet means fixedly carried by said float means and operative to change the state of said switch in the course of vertical movement of said float means with respect to said stem, and circumferentially continuous seal means coacting between said float means and an upper end formation on said stem and at an upper elevation above the elevation of changing the state of said switch, whereby liquid entry into the region of float guidance by said stem is avoided even in the presence of sloshing wave action at the surface of the liquid.

2. The float-switch construction of claim 1, in which said seal means includes an elastomeric ring carried by said stem.

3. The float-switch construction of claim 2, in which said float means includes an upwardly projecting annulus having circumferentially continuous engagement with said elastomeric ring at said upper elevation of said float means.

4. The float-switch construction of claim 3, in which said upwardly projecting annulus is an insert of relatively hard material and has a bore in relatively close-clearance guiding relation with said stem, said insert-bore clearance being the float-centering determining factor, whereby ring-to-insert seating engagement is at all times at substantially concentric alignment.

5. The float-switch construction of claim 1, in which stop means coacts between said float means and said stem at a lower elevation below the elevation of changing the state of said switch.

6. The float-switch construction of claim 5, in which said stop means includes a ring member carried by said stem near the lower end of said stem, said ring member interfering with said float means upon float descent to said lower elevation.

7. The float-switch construction of claim 1, and including a rigid protective inverted cup secured at its closed end to the upper end region of said stem, said cup having a skirt which radially clears said float means and is in at least partial axial overlap therewith for the range of float positions extending from the location of seal means coaction to a location below the elevation of changing the state of said switch.

8. The float-switch construction of claim 7, in which said seal means includes an elastomeric seal ring seated on said stem and against the closed end of said inverted cup.

* * * * *